(12) United States Patent
Sizer et al.

(10) Patent No.: US 7,968,034 B2
(45) Date of Patent: Jun. 28, 2011

(54) BASE-COAT IN-MOLD COATING

(75) Inventors: David Sizer, Parma, OH (US); Richard Harshbarger, Munroe Falls, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 1323 days.

(21) Appl. No.: 10/565,402

(22) PCT Filed: Jul. 15, 2004

(86) PCT No.: PCT/US2004/022892
§ 371 (c)(1),
(2), (4) Date: Sep. 11, 2006

(87) PCT Pub. No.: WO2005/010106
PCT Pub. Date: Feb. 3, 2005

(65) Prior Publication Data
US 2010/0221437 A1   Sep. 2, 2010

(51) Int. Cl.
*B29C 45/14* (2006.01)
*C08F 26/02* (2006.01)
(52) U.S. Cl. .......... 264/279; 264/255; 526/301
(58) Field of Classification Search .......... 264/255, 264/279
See application file for complete search history.

(56) References Cited

U.S. PATENT DOCUMENTS

| | | |
|---|---|---|
| 4,189,517 A | 2/1980 | Shanoski et al. |
| 4,222,929 A | 9/1980 | Shanoski et al. |
| 4,331,735 A | 5/1982 | Shanoski et al. |
| 4,414,173 A | 11/1983 | Cobbledick et al. |
| 4,515,710 A | 5/1985 | Cobbledick et al. |
| 5,084,353 A | 1/1992 | Cobbledick et al. |
| 5,391,399 A | 2/1995 | Cobbledick et al. |
| 5,498,763 A | 3/1996 | McGarry et al. |
| 5,523,337 A | 6/1996 | Banerjee et al. |
| 5,614,581 A | 3/1997 | Cobbledick et al. |
| 5,658,672 A | 8/1997 | Lenke et al. |
| 5,777,053 A | 7/1998 | McBain et al. |
| 2004/0023050 A1 * | 2/2004 | Kia et al. .......... 428/480 |

FOREIGN PATENT DOCUMENTS
EP  0854157 B1  7/1998
WO  WO 2005/010160 A2  2/2005

* cited by examiner

*Primary Examiner* — Yogendra N Gupta
*Assistant Examiner* — Alison Hindenlang
(74) *Attorney, Agent, or Firm* — Fay Sharpe LLP

(57) ABSTRACT

A coating composition for a fiber-reinforced plastic includes an aliphatic resin such as a saturated aliphatic ester intermediate polyurethane having terminal acrylate end groups, a hydroxyalkyl (meth)acrylate, a polyacrylate ester of an alkylene polyol, and a vinyl substituted aromatic.

13 Claims, No Drawings

BASE-COAT IN-MOLD COATING

BACKGROUND INFORMATION

The present invention relates to fiber-reinforced plastic (FRP) bearing thereon a composition that is suitable as a base coat in compression molding applications.

In-mold coating (IMC) compositions can be applied to FRP to provide a smooth surface and to reduce or eliminate substrate porosity. However, such coatings generally require painting to yield desirable end use properties.

A typical IMC composition involves the reaction product of an unsaturated'fumarate polyester diol, a saturated polyester diol flexibilizer, a crosslinking aliphatic polyol having from 3 to 6 hydroxyl groups, a diisocyanate, and an ethylenically unsaturated crosslinking compound such as styrene; see, e.g., U.S. Pat. Nos. 4,189,517 and 4,222,929.

Other approaches are described in, for example, U.S. Pat. Nos. 4,331,735, 4,414,173, 4,515,710, and 5,084,353.

SUMMARY OF THE INVENTION

The present invention provides a coating composition made from compounds that include a saturated polyester urethane acrylate and a saturated hydroxyalkyl (meth)acrylate. Inclusion of a polyacrylate ester of an alkylene polyol and a vinyl-substituted aromatic compound have been found to impart improved properties such as hardness, water resistance, low shrinkage, and adhesion to coatings made from such compositions. Optionally, a saturated (cyclo)aliphatic (meth)acrylate, which is thought to improve the flexibility of the coating, may be added, as well as one or more crosslinking agents.

The above components can be reacted in the presence of a peroxide initiator to chain extend and form a thermoset resin coating. The cured resin is clear unless pigmented. The present invention may be used as a finish coating in some applications, but the addition of a clear finish coat on its surface can be used to, e.g., enhance gloss. If a clear coating is not desired, various pigments, colorants, etc., can be added to yield a desired end color and opacity.

In the coating composition, certain compounds and resins, especially aromatic compounds such as aromatic polyesters and/or polyether urethane intermediates, aromatic epoxy-based resins, and the like, are avoided.

DETAILED DESCRIPTION OF ILLUSTRATIVE EMBODIMENTS

To achieve paint-like properties and clarity, the coating composition utilizes a saturated aliphatic polyester urethane which contains acrylate groups, generally at the terminal portions of the polymer. The polyester portion may be made from aliphatic dicarboxylic acids or aliphatic anhydrides and glycols. Such materials and their preparation are known and commercially available. The aliphatic dicarboxylic acids and anhydrides generally have from 1 to 15 carbon atoms and are desirably saturated (i.e., free of carbon-to-carbon double bonds) with specific examples including carbonic acid, malonic acid, succinic acid, glutaric acid, adipic acid, pimelic acid, suberic acid, azelaic acid, sebacic acid, the anhydride counterparts thereof, and the like, with adipic acid generally being preferred. Mixtures of two or more of the foregoing acids can be utilized as well. The polyols generally have from 2 to 15 carbon atoms and are saturated, with specific examples including ethylene glycol, propylene glycol, 1,3-butylene glycol, 1,4-butylene glycol, pentane diol, hexane diol, cyclohexanedimethanol dipropylene glycol, 2,2-dimethyl-1,3-propane diol, diethylene glycol, pinacol, and the like. Preferred glycols include ethylene glycol and neopentyl glycol.

The saturated aliphatic polyester intermediate generally has a number average molecular weight of from about 1000 to about 5000, and desirably from about 1500 to about 2500.

An aliphatic polyisocyanate can be reacted with the saturated polyester intermediate to form a polyurethane. The aliphatic portion is saturated and has from about 5 to 18 carbon atoms such as isophorone diisocyanate (IPDI), hexamethylene diisocyanate, cyclohexyl diisocyanate, and the like, with isophorone diisocyanate being preferred. The average equivalent ratio of NCO groups to OH end groups of the intermediate is from about 1.5 to about 2.5, desirably from about 1.9 to about 2.1, and preferably about 2.0. Such amounts are generally sufficient to form an isocyanate-terminated polyurethane prepolymer which then can be reacted with a hydroxyalkyl acrylate to form the saturated polyester urethane containing (meth)acrylate generally at the terminal portions of the polymer chain. The acrylates can generally have a $C_2$-$C_{10}$ ester portion such as ethyl, propyl, n-butyl, ethylhexyl, and the like, with ethyl and propyl being preferred. An example of a preferred material is CN963B80 polyester urethane acrylate diluted with 10-30% 1,6-hexanediol diacrylate (Sartomer Co., Inc.; Exton, Pa.).

Polyester urethane acrylates in which one or both of the polyester precursors and polyisocyanates are unsaturated and/or aromatic preferably are not inasmuch as they may yield a coating with a tendency to yellow and degrade on aging. The polyester urethane acrylates are hence substantially free of such compounds, meaning that they generally contain unsaturated and/or aromatic components in an amount less than 25% (by wt.), desirably less than 10% (by wt.), preferably less than 5% (by wt.), and more preferably none at all, based upon the total weight of such polymer(s). Other compounds or monomers that preferably are avoided in the formation of the polyester urethane acrylates are polyethers and epoxy intermediates inasmuch as the same have been found to negatively affect weathering properties of coatings made therefrom. Thus, the polyurethane intermediate contains, based upon the total weight of the polyester urethane acrylates, less than 50% (by wt.), generally less than 25% (by wt.), preferably less than 10% (by wt.), more preferably less than 5% (by wt.), or none at all of polyether and/or epoxy groups.

Various compounds or components are utilized to react with the polyester urethane acrylate and form a thermoset resin. One component utilized is one or more hydroxyalkyl (meth)acrylates, wherein the alkyl group can contain from 1 to 10 carbon atoms, preferably from 1 to 5 carbon atoms, such as methyl, ethyl, butyl, etc., with propyl being preferred. The amount of such hydroxyalkyl (meth)acrylates is generally from about 2 to about 20 parts by weight (pbw), desirably from about 4 to about 16 pbw, and preferably from about 6 to about 12 pbw per 100 pbw of the polyester urethane acrylate. These compounds are utilized in addition to the hydroxyalkyl methacrylates that may be utilized to form the polyester urethane acrylate resins.

Another component is one or more vinyl-substituted aromatic compounds. These preferably contain a total of from 8 to 12 carbon atoms, examples of which include styrene, α-methyl-styrene, vinyl toluene, t-butyl styrene, and the like, with styrene being preferred. The amount of this component is generally from about 10 to about 100 pbw, desirably from about 30 to about 80 pbw, and preferably from about 45 to about 75 pbw per 100 pbw of polyester urethane acrylate.

Still another component is a polyacrylate, such as a triacrylate or preferably a diacrylate, ester of an alkylene polyol wherein the polyol has from about 2 to about 30 carbon atoms and preferably from about 2 to about 10 carbon atoms such as ethylene diol, butane diol, and the like. The ester moiety on the ends of the alkylene polyol is generally derived from (meth)acrylic acid or similar unsaturated carboxylic acid. Examples of preferred diacrylate esters of an alkylene diol include triethylene glycol di(meth)acrylate, (di)ethylene glycol di(meth)acrylate, tetraethylene glycol di(meth)acrylate, polyethylene glycol di(meth)acrylate, 1,3-butylene glycol di(meth)acrylate, 1,4-butanediol di(meth)-acrylate, 1,6-hexanediol di(meth)acrylate, (propoxylated) neopentyl glycol di(meth)acrylate, polyethylene glycol (200, 400, 600) di(meth)acrylate, tripropylene glycol diacrylate, and alkoxylated aliphatic diacrylate. Examples of tri-functional acrylate esters of an alkylene polyol which can be optionally utilized include tris(2-hydroxyethyl) isocyanurate tri(meth)acrylate, (alkoxylated) trimethylolpropane tri(meth)acrylate, pentaerythritol triacrylate, and propoxylated glyceryl triacrylate. A preferred polyacrylate ester of an alkylene polyol for use in the present invention is 1,6-hexanediol diacrylate.

The amount of the diacrylate ester of the alkylene polyol is generally from about 10 to about 40 pbw, desirably from about 15 to about 35 pbw, and preferably from about 20 to about 30 pbw for every 100 pbw of the polyester urethane acrylate. The amount of the optional triacrylate ester of the alkylene polyol is low and generally is less than 10 pbw and preferably less than 5 pbw for every 100 pbw of the polyester urethane acrylate.

A coating composition derived from ingredients that include the foregoing generally is clear. Alternatively, the coating can be colored by utilizing a pigment, colorant, or the like in an amount to yield a desired color, tint, hue, or opacity. Pigments and pigment dispersions are known to the art and include, for example, $TiO_2$, carbon black, phthalocyanine blue or red, chromium and ferric oxides, and the like.

The coating composition optionally can contain additional components such as a (cyclo)aliphatic (meth)acrylate wherein the (cyclo)aliphatic portion is saturated and contains from about 1 to about 50 carbon atoms, desirably from about 2 to about 20 carbon atoms. Representative examples include methyl (meth)acrylate, tetrahydrofurfuryl (meth)acrylate, isodecylmethacrylate, 2(2-ethoxy)ethoxy ethylacrylate, stearyl (meth)acrylate, lauryl (meth)acrylate, glycidyl methacrylate, isodecyl acrylate, isobornyl (meth)acrylate, tridecyl (meth)acrylate, and caprolactone acrylate, with isobornyl acrylate being preferred. The (cyclo)-aliphatic (meth)acrylate, when present, may optionally be added as a monomer diluent for the aliphatic polyester urethane acrylate component. Thus, Ebecryl™ 8411 aliphatic urethane diacrylate diluted 20% with isobornyl acrylate monomer (Surface Specialties Inc. of the UCB Group of companies; Smyrna, Ga.). The amount of the saturated (cyclo)aliphatic (meth)acrylate, when present, is generally from about 0.1 to about 25 pbw, desirably from about 0.1 to about 15 pbw, and preferably from about 0.5 to about 10 pbw per 100 total pbw of the polyester urethane acrylate.

The coating compositions of the present invention can also contain conventional additives, and fillers, etc., in conventional amounts. Thus, various cure inhibitors such as benzoquinone, (methoxy)hydroquinone, p-t-butylcatechol, and the like, can be utilized. Another additive is an accelerator such as cobalt octoate. Other classes of accelerators include zinc, or other metal, carboxylates. Various light stabilizers can be utilized such as, for example, the various hindered amines (HALS), substituted benzophenones, and substituted benztriazoles, and the like. Lubricants and mold release agents are generally utilized with specific examples including various metal stearates, such as zinc stearate or calcium stearate or phosphonic acid esters. Reinforcing fillers such as talc can be utilized. Talc has also been found to help promote adhesion of the in-mold coating composition to the fiber reinforced plastic substrate. Another additive is a hardener and thixotrope such as silica.

The polyester urethane acrylate and the other curing monomers or components of the present invention are chain extended through the utilization of a free radical initiator such as a peroxide. Examples of suitable free radical initiators include tertiary butyl perbenzoate, tertiary butyl peroctoate in diallyl phthalate, diacetyl peroxide in dimethyl phthalate, dibenzoyl peroxide, di(p-chlorobenzoyl) peroxide in dibutyl phthalate, di(2,4-dichlorobenzoyl) peroxide in dibutyl phthalate dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumylhydroperoxide, diacetyl peroxide, t-butyl hydroperoxide, ditertiary butyl peroxide, 3,5-dihydroxy-3,5-dimethyl-1,2-oxacyclopentane, and 1,1.bis(t-butylperoxy)-3,3,5-trimethyl cyclohexane and the like, and mixtures thereof. Another suitable free radical initiator is Luperox™ 575 t-amyl peroxy-2-ethylhexanoate (ATOFINA Chemicals, Inc.; Philadelphia, Pa.).

Using mixtures of initiators to take advantage of, e.g., their different decomposition rates and times at different temperatures can be desirable. A preferred initiator is t-butyl perbenzoate. The peroxide initiator preferably is used in an amount sufficient to overcome the effect of any inhibitor and to cause curing of the ethylenically unsaturated compounds. In general, the peroxide initiator is used in an amount of from about 0.25 to about 5%, desirably from about 1 to about 4%, and preferably from about 1 to about 2%, by weight based on the total weight of all of the ethylenically unsaturated components employed in the coating compositions. The reaction of the polyester urethane acrylate with the curing components in the presence of the peroxide initiator is generally at a temperature of from about 90° to about 165° C. (200°-330° F.) and desirably from about 130° to about 155° C. (270°-310° F.).

The coating composition can be prepared as follows: the polyester urethane acrylate can be mixed with the vinyl-substituted aromatic compound(s) (e.g., styrene) and the hydroxyalkyl (meth)acrylate (e.g., hydroxypropyl methacrylate) and, if a saturated (cyclo)aliphatic (meth)acrylate such as isobornyl acrylate is included, this component is included in the mixture; after these compounds are mixed, fillers and additives such as cure inhibitors, light stabilizers, lubricants, etc., are added and mixed; the free radical peroxide initiator typically is added last. (The polyacrylate ester of a polyol is typically present in the polyester urethane acrylate from the supplier.)

When a coating having a specific color is desired, one or more pigments, colorants, etc., can be utilized in suitable amounts. As known, often times various pigments or colorants are added with a carrier, for example, a polyester, so that they can be easily blended. Any conventional or suitable mixing vessel can be utilized, and the various components and additives mixed until the compounds are blended. Even if pigments are not contained in the blend, the mixture at this point is typically not clear. When desired, the mixed ingredients are coated onto a FRP such as a sheet molded compound as by injection molding with the IMC composition heated to a cure temperature. The cure temperature will vary depending upon the particular curative or peroxide utilized. Suitable cure temperatures generally range from about 90° to about 165° C. (200°-330° F.).

Upon cure or chain extension, the coating becomes clear and have very good properties such as high clarity, good adhesion to an FRP substrate such as a sheet molded compound, good hardness (e.g., a pencil hardness of at least H and desirably at least 2H), good scratch resistance, good water resistance, and good UV resistance. Such properties result in a coating which may be suitable as a finished surface in certain applications. However, a clear top coat can be applied to the surface after application of the coating to impart a high gloss to the composite, especially in those applications that demand high gloss finishes, such as automotive and other areas. That is, the coating composition when cured can be utilized as is with regard to some particular end use applications and does not need subsequent surface treatments, e.g., coating, another layer, etc., such as a paint, and the like. Nevertheless, a clear, high gloss top coat is preferred when a high gloss finish is desired.

The resulting coatings are generally flexible and can be utilized on any surface of a FRP substrate which can be a thermoplastic or a thermoset, on sheet molded compounds which are generally thermosets, on low pressure molding compounds (LPMC), and the like. Suitable end uses of finished or top-coated coating compositions of the present invention include various automotive parts such as spoilers, air dams, truck liners, patio furniture, satellite dishes, water craft components, and the like.

The invention will be better understood by reference to the following illustrative, non-limiting examples.

EXAMPLES

Formulas A and B, Set Forth Below, were Mixed and Molded as Follows

Formula A

CN963B80™ polyester urethane acrylate (PUA), diacrylic ester of hexanediol, styrene, isobornyl acrylate and hydroxypropyl methacrylate (HPMA) in the indicated amount were added to a container and mixed thoroughly using mixing procedures conventional for organic resin solutions. Hydroquinone, cobalt octoate (12% in mineral oil), and zinc and calcium stearates were weighed into the resin solution prepared above, and again mixed thoroughly to dissolve the organics and disperse the stearates. Talc and Cab-O-Sil™ fumed silica (Cabot Corp.; Billerica, Mass.) were then weighed into the container with the organics and stearates, and mixed thoroughly to disperse the solids. All of the mixing occurred without external heating. A t-butyl perbenzoate initiator was added to the solution prepared above, and mixed thoroughly.

The FRP molding was prepared in a 40.6 cm×40.6 cm chromed steel shear-edge mold from a conventional polyester SMC used commercially to prepare exterior automotive body panels. Molding conditions for the SMC were 149° C., a 70-second cure time, and 6.9 MPa pressure.

The coating was applied immediately following SMC cure by opening the mold, pouring in the coating on the FRP molding, and re-closing the mold. Cure conditions for the IMC were 149° C., a 60-second cure time, and 6.9 MPa pressure.

Formula B

Same as formula A, with the exception of the addition of isobornyl acrylate and a second aliphatic polyester urethane acrylate (Ebecryl™ 8411).

The formulations set forth below are based on a 600 g coating sample. Thus, the weight values provided below are the amount of each component added to obtain 600 g of the coating and will change if the amount of coating to be produced is varied. Of course, the weight percent of each component will remain constant regardless of the amount of coating.

TABLE 1

|  | FORMULA A | | FORMULA B | |
| --- | --- | --- | --- | --- |
|  | weight % | weight (g) | weight % | weight (g) |
| CN963B80 PUA | 41.72 | 250.31 | 39.72 | 238.32 |
| Ebecryl 8411 PUA | 0.00 | 0.00 | 2.00 | 12.00 |
| HPMA | 2.86 | 17.18 | 2.86 | 17.18 |
| cobalt octoate | 0.39 | 2.31 | 0.39 | 2.34 |
| hydroquinone | 0.03 | 0.17 | 0.03 | 0.18 |
| fumed silica | 1.35 | 8.09 | 1.35 | 8.10 |
| zinc stearate | 0.51 | 3.08 | 0.51 | 3.06 |
| calcium stearate | 0.19 | 1.16 | 0.19 | 1014 |
| talc | 4.81 | 28.88 | 4.81 | 28.86 |
| styrene | 24.07 | 144.41 | 24.07 | 144.42 |
| white paste* | 24.07 | 144.41 | 24.07 | 144.42 |
| Total: | 100% | 600 g | 100% | 600 g |

*50% by wt. each of CN963B80 PUA and TiO$_2$.

Formulations A and B were tested with regard to various properties such as pencil hardness, tape adhesion and chip resistance. The results of these tests are set forth in Table 2.

TABLE 2

| Test | Formula A | Formula B |
| --- | --- | --- |
| Pencil Hardness | H | H |
| Tape adhesion (GM9071P) | 100% | 100% |
| Cross-hatch tape adhesion (Ford B1 106-1) | 0 | 0 |
| Chip resistance (GM9506P) | 9 | 9 |

As apparent from the data of Table 2, coatings made from these compositions exhibit good properties. Addition of Ebecryl™ 8411 PUA (formula B) appears to increase the flexibility of the resulting coating, although the flexibility of the coating from formula A is quite sufficient for most applications.

What is claimed is:

1. A coating composition, comprising;
   a saturated aliphatic polyester urethane acrylate;
   (b) a hydroxyalkyl (meth)acrylate;
   (c) a vinyl-substituted aromatic compound;
   (d) a polyacrylate ester of an alkylene polyol wherein said alkylene group has from 2 to 30 carbon atoms;
   (e) a (cyclo)aliphatic (meth)acrylate, wherein said (cyclo)aliphatic group is saturated and comprises from 1 to 50 carbon atoms wherein, for every 100 parts by weight saturated aliphatic polyester urethane acrylate, the amount of said (cyclo)aliphatic (meth)acrylate is from 0.1 to 15 parts by weight; and
   (f) optionally, a peroxide initiator.

2. The coating composition of claim 1 wherein at least one of the following is true: the number average molecular weight of the saturated polyester portion of said saturated aliphatic polyester urethane acrylate is from about 1000 to about 5,000, said vinyl-substituted aromatic compound comprises from 8 to 12 carbon atoms, and the alkyl moiety of said hydroxyalkyl group comprises from 1 to 10 carbon atoms.

3. The coating composition of claim 1 wherein, for every 100 parts by weight of said saturated aliphatic polyester urethane acrylate, the amount of said hydroxyalkyl (meth)acrylate is from 2 parts to 20 parts by weight, the amount of said vinyl-substituted aromatic compound is from 10 to 70 parts by weight, and the amount of said polyacrylate ester of an alkylene polyol is from 10 to 40 parts by weight.

4. The coating composition of claim 3 comprising, for every 100 parts by weight of said saturated aliphatic polyester urethane acrylate, from 6 to 16 parts by weight of said hydroxyalkyl (meth)acrylate, from 20 to 60 parts by weight of said vinyl-substituted aromatic compound, and from 15 to 35 parts by weight of said polyacrylate ester of an alkylene polyol.

5. The coating composition of claim 1 wherein at least one of the following is true: said saturated aliphatic polyester urethane acrylate is prepared from ingredients comprising neopentyl glycol, ethylene glycol, adipic acid, isophorone diisocyanate, and hydroxyethyl (meth)acrylate, said hydroxyalkyl (meth)acrylate is hydroxpropyl methacrylate, said vinyl-substituted aromatic compound is styrene, and said polyacrylate ester of an alkylene polyol is a diacrylic ester of hexanediol.

6. The coating composition of claim 1 wherein a polyester portion of said saturated aliphatic polyester urethane acrylate is derived from at least a saturated carboxylic acid or an anhydride thereof and a saturated diol, and said urethane portion of said saturated aliphatic polyester urethane acrylate is derived from an aliphatic saturated polyisocyanate.

7. The coating composition of claim 6 wherein at least one of the following is true: said saturated carboxylic acid or anhydride has from 1 to 15 carbon atoms, said saturated diol contains from 2 to 15 carbon atoms, and said saturated polyisocyanate is a $C_5$-$C_{18}$ diisocyanate.

8. The coating composition of claim 1 wherein at least one of the following is true: said hydroxyalkyl (meth)acrylate comprises a $C_1$-$C_5$ alkyl group and said polyol comprises a $C_2$-$C_{10}$ alkylene group.

9. The coating composition of claim 1 wherein said (cyclo)aliphatic (meth)acrylate is selected from the group including methyl (meth)acrylate, tetrahydrofurfuryl (meth)acrylate, isodecylmethacrylate, 2(2-ethoxy)ethoxy ethylacrylate, stearyl (meth)acrylate, lauryl (meth)acrylate, glycidyl methacrylate, isodecyl acrylate, isobornyl (meth)acrylate, tridecyl (meth)acrylate, and caprolactone acrylate.

10. The coating composition of claim 1 wherein said (cyclo)aliphatic (meth)acrylate is isobornyl acrylate.

11. The coating composition of claim 1 wherein the amount of said (cyclo) aliphatic (meth)acrylate is 0.5-10 parts by weight.

12. The composition of claim 1, wherein said (cyclo)aliphatic (meth)acrylate is added as monomer diluent for the aliphatic polyester urethane acrylate component.

13. A process for applying a coating composition to a molded, fiber-reinforced plastic substrate and forming a coating thereon, comprising:
   a) into a die defining a mold cavity in which the molded, fiber-reinforced plastic substrate has been allowed to harden, injecting a metered amount of the coating composition of claim 1 and allowing said coating composition to contact at least a portion of a surface of said substrate;
   b) applying molding pressure to distribute said coating composition over said surface;
   c) maintaining said pressure while said material bonds to said surface and solidifies sufficiently to permit complete separation of said component pieces of said die without disruption of the coating thus formed; and
   d) opening said die and removing said coated substrate from said cavity.

* * * * *